United States Patent Office 2,898,291
Patented Aug. 4, 1959

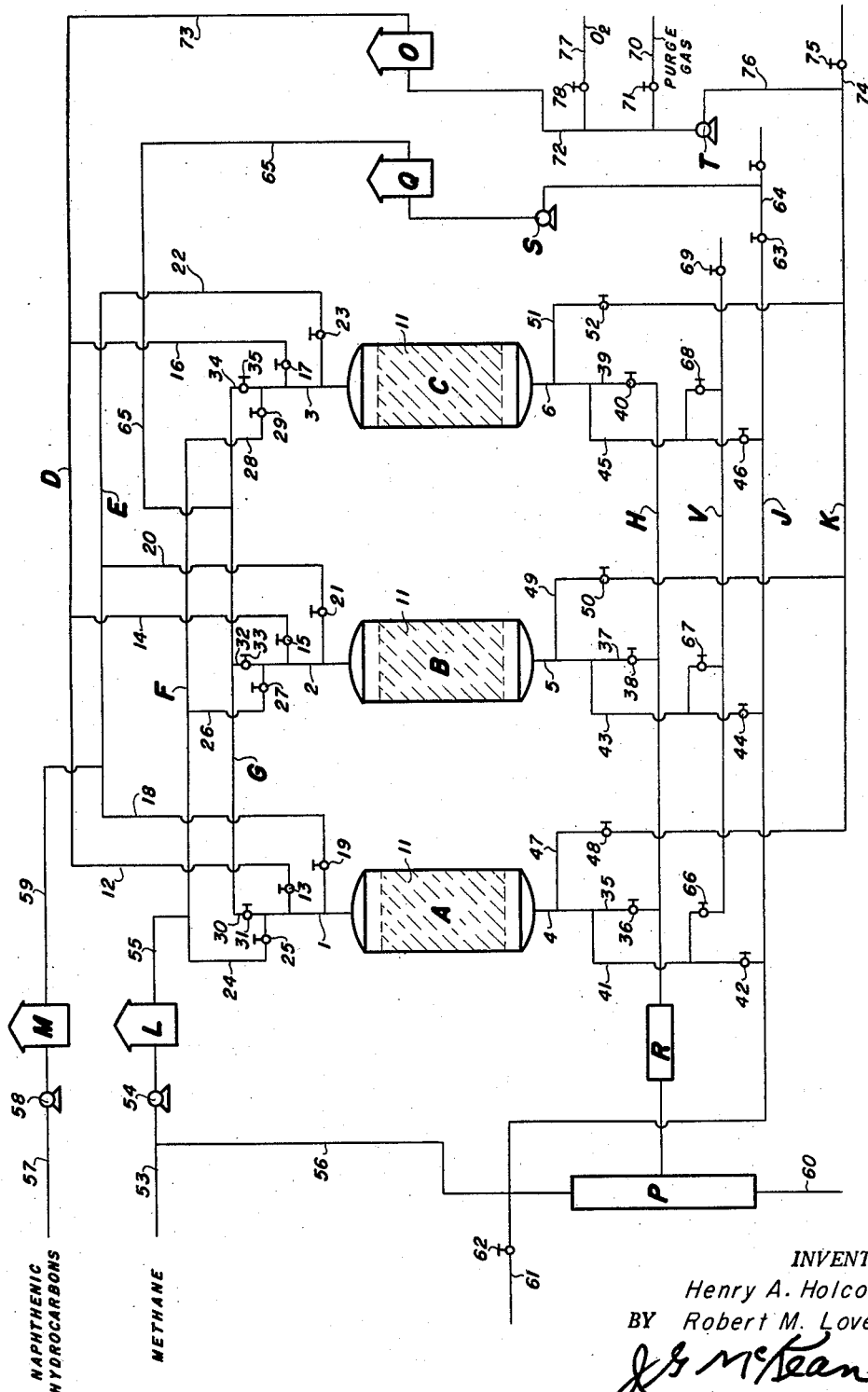

2,898,291

STARTING UP OF REFORMING UNIT USING PLATINUM CATALYST WITHOUT EXTRANEOUS HYDROGEN

Henry A. Holcomb and Robert M. Love, Baytown, Tex., assignors, by mesne assignments, to Esso Research and Engineering Company, Elizabeth, N.J., a corporation of Delaware Application May 12, 1954, Serial No. 429,206

4 Claims. (Cl. 208—138)

The present invention is directed to an improvement in starting up a system for reforming hydrocarbons in the presence of a platinum catalyst without requiring hydrogen from an extraneous source.

The catalytic reforming of a hydrocarbon feed stock in the presence of platinum catalyst is well known to the art. In this procedure a feed mixture consisting of vaporized hydrocarbon and hydrogen is contacted with platinum catalyst in a reaction zone to cause reforming of at least a portion of the hydrocarbon. The present invention is directed to a procedure whereby a reforming system having a plurality of independent reaction zones each containing platinum catalyst may be started up or put onstream without requiring an extrangeous source of supply of hydrogen.

In carrying out the process of the present invention, a reforming system having a plurality of independent reaction zones containing platinum catalyst is brought onstream by passing a mixture of gas consisting essentially of methane and hydrocarbon feed to a first zone at a reaction temperature to produce hydrogen containing gas which is circulated through the remaining zones to heat them up, thereafter a charge mixture of hydrocarbon and hydrogen-rich gas is charged to the remaining zones and the catalyst in the first zone is then regenerated and brought onstream by the use of hydrogen-rich gas being generated in the other already operating units.

The gas mixture consisting essentially of methane used in the practice of the present invention for convenience will usually be natural gas. However, other sources of supply of methane may be used for this purpose, it being understood that the gas mixture consisting essentially of methane referred to in the present description contains at least 90% methane and is substantially free from materials such as carbon monoxide, carbon dioxide, and hydrogen sulfide which might be harmful to the platinum catalyst.

In the conventional reforming process employing a platinum catalyst, it is desirable to put the reaction zones onstream as it is called, that is to bring the reaction zones containing platinum catalyst from their inactive to their active condition, by passing hot hydrogen or hydrogen-rich gas through the reaction zone into contact with the platinum catalyst bed until the entire reaction zone including the platinum catalyst bed is at the desired temperature for the reforming reaction at which time the flow of hydrogen-rich gases is continued in a reactor and vaporized hydrocarbon feed stock is added thereto so as to cause the reforming of at least a portion of the hydrocarbon feed stock.

In the catalytic reforming of hydrocarbon feed stock, it is desirable to use as a feed stock naphthenic hydrocarbons boiling in the range of 150 to 500° F. such as are obtained from crude petroleums such as Coastal crude oils, California type crudes and particularly from naphthenic base crude petroleum. Naphthenic fractions suitable for feed stock may also be obtained from catalytic conversion operations such as catalytic cracking operations and such feed stocks boiling in the range of 150 to 500° F. may be used either alone or in admixture with crude oil fractions as the feed stock for a reforming operation.

In the reforming reaction it is preferred to charge the vaporized feed stock at a liquid space velocity in the range from about 1 to about 4 liquid volumes of feed per volume of catalyst per hour. A space velocity of 2 v./v./hr. gives very desirable results when charging a hydrocarbon fraction from a Coastal crude.

It is preferred to charge the mixture of vaporized hydrocarbon feed stock and hydrogen to the reaction zone containing the platinum catalyst at a reaction temperature within the range of 850 to 1000° F. with a preferred temperature of about 925° F. The reforming reaction being endothermic, and commercial reactors ordinarily operating adiabatically, the reactor outlet temperature will ordinarily be between 700° and 950° F. The pressure employed in the reaction zone may be within the range of 50 to 700 pounds per square inch with a preferable range of about 200 to about 400 pounds per square inch. The amount of hydrogen employed for the reaction may range from about 1000 cubic feet to about 10,000 cubic feet per barrel of feed. Preferably about 5000 cubic feet of hydrogen per barrel of feed may be used.

The catalyst employed in the practice of the present invention preferably will be a platinum on alumina catalyst containing from about 0.1% to 3.0% by weight of platinum, preferably 0.2% to 1.0% by weight. It is desirable that the alumina on which the platinum is deposited be a purified alumina, such as a gamma alumina derived from boehmite. Although gamma alumina or purified alumina is preferred, we may use a platinum on alumina derived from other sources. There are numerous aluminas on the market which are available as supports for catalysts and we intend that we may use a platinum on alumina catalyst of the type available. We also intend that other supported platinum catalysts may be used such as platinum on zirconia, magnesia, and magnesia-aluminum mixtures, and the like.

The process of the present invention will now be described in detail. A reforming system containing a plurality of separate reaction zones each containing platinum reforming catalyst is brought onstream by passing a heated stream of gas consisting essentially of methane into a first selected reaction zone, contacting it with platinum catalyst in said zone and removing the effluent stream from said zone. The temperature of the gas consisting essentially of methane employed is above the dew point of the feed stock and no greater than 1000° F. When the first reaction zone including the platinum catalyst has been heated to a temperature within the range given, a mixture of vaporized hydrocarbon feed stock and the circulating methane heated to said temperature range is fed to said first selected reaction zone. When the mixture of feed stock and gas consisting essentially of methane contacts the platinum catalyst, dehydrogenation of hydrocarbon feed stock takes place and the effluent from the reaction zone contains hydrogen. The reaction is an endothermic reaction and in order to maintain the temperature within the desired range the normally gaseous fraction of the effluent is segregated and at least a portion thereof is reheated and recycled to the reaction zone with the addition of further amounts of vaporized hydrocarbon feed stock. Excess gas is removed from the system and the recycling of gas with addition of vaporized feed stock is continued until the hydrogen content of the recycled gas is greater than 50% at which time a portion of the recycle gas from the first zone, reheated if necessary to a temperature within the range of above the dew point of the feed stock to 1000° F., is passed to one or more of the remaining reaction zones. Said recycle gas is charged to said other reaction zones and may be circulated therethrough, with reheating, until the zones are at equilibrium temperatures in the desired range between the dew point of the feed stock and 1000° F. whereupon vaporized hydrocarbon feed stock is added to said circulating gases and thus the said other reaction zones are put onstream, the reforming reaction in these zones then being carried out in the usual fashion.

It will be understood that in carrying out the present invention, the reforming system is provided with a plurality of separate reaction zones. A minimum of at least two separate reaction zones each containing platinum reforming catalyst is required, but a greater number may be employed as desired, for example three, four, or six separate zones. After the recycle gases in the first zone contain over 50% hydrogen, these gases may be used to bring the remaining zones in the system onstream either individually or simultaneously. For example, if the reforming system contains four separate reaction zones, one of the zones is used as the first selected zone for generating gases containing hydrogen and these gases are then used to bring the other three zones onstream either separately or simultaneously. After the remaining zones have been brought onstream, hydrogen is generated by the reforming reaction being carried out in these zones and at this time the first selected zone is regenerated in the known manner by controlled combustion of the carbon and carbonaceous material which has deposited on the platinum catalyst, this controlled combustion being carried out at a temperature no greater than 1100° F. The catalyst is then contacted with hydrogen-rich gas secured from one or more of the other reaction zones in the system and the first selected zone then put onstream by passing a mixture of hydrocarbon feed stock and hydrogen-rich gas into said zone to cause reforming of said hydrocarbons.

For a preferred method of regenerating a platinum catalyst in a reaction zone used in a reforming process, see copending application Serial No. 429,367 by Robert M. Love, entitled "Process for Regenerating Platinum Catalyst in a Reforming Process," filed May 12, 1954.

In order to illustrate further the practice of the present invention, a procedure will be described in conjunction with the drawing which is in the form of a diagrammatic flow sheet.

It will be assumed that the system is ready to be started up with active platinum catalyst in each of beds 11 in reaction zones A, B, and C. Zones A, B, and C are provided with inlet lines 1, 2, and 3, respectively, and with outlet lines 4, 5, and 6, respectively. Manifold D is connected by branch line 12 controlled by valve 13 to inlet line 1, by branch line 14 controlled by valve 15 to inlet line 2, and by branch line 16 controlled by valve 17 to inlet line 3. Manifold E is connected by branch line 18 controlled by valve 19 to inlet line 1, by branch line 20 controlled by valve 21 to inlet line 2, and by branch line 22 controlled by valve 23 to inlet line 3. Manifold F is connected by branch line 24 controlled by valve 25 to inlet line 1, by branch line 26 controlled by valve 27 to inlet line 2, and by branch line 28 controlled by valve 29 to inlet line 3. Manifold G is connected by branch line 30 controlled by valve 31 to inlet line 1, by branch line 32 controlled by valve 33 to inlet line 2, and by branch line 34 controlled by valve 35 to inlet line 3.

Manifold H is connected by branch line 35 controlled by valve 36 to outlet line 4, by branch line 37 controlled by valve 38 to outlet line 5, and by branch line 39 controlled by valve 40 to outlet line 6. Manifold J is connected by branch line 41 controlled by valve 42 to outlet line 4, by branch line 43 controlled by valve 44 to outlet line 5, and by branch line 45 controlled by valve 46 to outlet line 6. Manifold K is connected by branch line 47 controlled by valve 48 to outlet line 4, by branch line 49 controlled by valve 50 to outlet line 5, and by branch line 51 controlled by valve 52 to outlet line 6.

Methane from a source not shown is passed from inlet line 53 and compressor 54 to furnace L where it is heated to a temperature in a range between the dew point of the feed stock and 1000° F. and is then discharged through line 55 into manifold F. Assume that reaction zone A is to be the zone in which hydrogen is to be produced in which case the valves 27 and 29 in branch lines 26 and 28 are closed while valve 25 in branch line 24 is open to allow methane to pass through line 24 and open valve 25 into inlet line 1 and thence into the reaction zone A. The effluent gases from the reaction zone A are recycled by way of outlet line 4, branch line 41 through open valve 42 to manifold J and thence through recycle line 56 which discharges into line 53 so that recycling is continued with additional methane introduced into the system as required. The hot methane is recycled through the reaction zone A until the reaction zone is heated to a temperature in a range between the dew point of the feed stock and 1000° F. Thereafter, a naphthenic hydrocarbon feed stock is charged through line 57 from a source not shown and is pumped by pump 58 to furnace M where it is heated to a temperature between the dew point of the feed stock and 1000° F., the furnace discharging the vaporized feed through line 59 into manifold E and thence by branch line 18 and open valve 19 into inlet line 1 of reactor A where it is admixed with the hot methane, the mixture passing into reaction zone A. In reaction zone A dehydrogenation of feed stock takes place, as may other reforming reactions, and the resultant effluent containing hydrogen leaves reactor A through outlet line 4, open valve 36 and branch line 35 through cooler and condenser R into separator P. Valve 42 on branch line 41 is closed during this operation. From separator P the liquid product is withdrawn at the bottom through line 60. The hydrogen containing gases leave the top of separator P and are recycled as before through line 56 to line 53.

When the gases leaving separator P through line 56 contain 50% or more hydrogen, these gases may be used for starting up units B and C. A portion or all of the effluent gases from separator P may be withdrawn from manifold J through open valve 63 and branch line 64, passed through compressor S, heated in furnace Q and conducted through line 65 to manifold G. If reaction zones B and C are to be brought onstream simultaneously in parallel, valves 33 and 35 are both open to allow the hot hydrogen containing gases to flow simultaneously into reaction zones B and C. These gases leave reaction zones B and C by branch line 43 and open valve 67 and by branch line 45 and open valve 68, respectively, to manifold V from which they are vented through open valve 69 or alternately the gases leave reaction zones B and C through branch line 43 with open valve 44 and branch line 45 with open valve 46, respectively, the manifold J from which they are recycled through open valve 63, compressor S, furnace Q and line 65 to manifold G until reaction zones B and C reach temperatures above the dew point of the feed stock but less than 1000° F. whereupon naphthenic hydrocarbon feed stock may be introduced into zone B by opening valve 21 which allows feed to pass from manifold E through branch line 20 and into inlet line 2 of zone B where it is commingled with the hydrogen containing gases and the mixture discharged to zone B and naphthenic hydrocarbon feed stock may be introduced into zone C by opening valve 23 which allows feed stock to pass from manifold E through branch line 22 and into inlet line 3 where it is commingled with hot hydrogen containing gases, the mixture then passing to reaction zone C. When reactor B is put onstream valve 44 is closed and valve 38 is open so that the effluent is withdrawn from reaction zone B by way of outlet line 5 through open valve 38 and branch line 37 into manifold H and when reaction zone C is put onstream valve 46 is closed so that effluent is withdrawn through outlet line 6, open valve 40 and branch line 39 to manifold H, the product passing from manifold H through cooler-condenser R to separator P where the liquid and gases are separated with the liquid being withdrawn through outlet 60. The gases are withdrawn from separator P through manifold J, open valve 63, line 64, compressor S, passed through heater Q and thence through line 65 to manifold G and thence returned to the reaction zones B and C. Excess gas may be withdrawn from line 56, leaving the top of the separator P by means of branch line 61 controlled by valve 62.

Instead of putting reaction zones B and C onstream simultaneously, they may be put onstream separately with either B or C selected as the first zone put onstream and the other as the second zone put onstream.

After reaction zones B and C have been put onstream, either simultaneously or in sequence as desired, the catalyst in reactor A which has become at least partially deactivated by the deposit of carbonaceous material thereon is regenerated. In the regeneration step, flow of feed through reactor A is discontinued by closing valve 19. Then flow of recycle gas is discontinued by closing valve 25. Valve 36 is closed. A purge gas from a source not shown, preferably flue gas which has been scrubbed with caustic to remove carbon dioxide therefrom, is introduced through inlet line 70, controlled by valve 71 to line 72, and passes through furnace O and through line 73 which connects to manifold D. The purge gas passes from manifold D through line 12 and open valve 13 to inlet line 1 and thence to reactor A. The purge gas is withdrawn from reactor A by way of line 4, branch line 47 and open valve 48 to manifold K and may be discharged through outlet line 74 controlled by valve 75 or may be recycled by way of line 76 and compressor T to line 72. After the hydrocarbon feed stock has been purged from unit A by the purge gas, oxygen in controlled amounts is introduced through inlet line 77 controlled by valve 78 and passes into line 72, the mixture of purge gas and oxygen in controlled amounts then being heated in furnace O and thence passing through line 73, manifold D and lines 12 and 1 to zone A, the amount of oxygen being controlled to cause burning of carbonaceous material in zone A with a temperature of the advancing flame front no greater than 1100° F. After the controlled combustion of carbonaceous materials in zone A, the flow of oxygen is terminated through inlet line 77 and zone A again purged by inert gas after which the catalyst is returned to the desired temperature by passing hot hydrogen containing gas into reaction zone A, the hydrogen containing gas being withdrawn from manifold G through branch line 30 and open valve 31 until the temperature of the activated platinum catalyst in zone A is at a selected temperature between the dew point of the feed stock and 1000° F. whereupon naphthenic feed stock is passed from manifold E through branch line 18 for admixture with the hydrogen containing gases in inlet line 1, the mixture of feed stock and hydrogen then passing to zone A. At this time all of the reaction zones A, B, and C are onstream and the reforming operation may be carried out in the usual manner.

In the above description, reactors A, B and C are shown to be operating in parallel. It will usually be desirable, once reaction conditions have been established, to operate reactors A, B and C in series. This may be done by passing total effluent from reactor A through lines not shown to a heater, not shown, which reheats the effluent to a desirable inlet temperature, and thence to reactor B, and similarly passing total effluent from reactor B through lines not shown to a heater, not shown, which reheats the effluent to a desirable inlet temperature, and thence to reactor C. Such reactor systems are well known to the art.

While specific conditions and examples have been given in the foregoing description, it is to be understood that these are given by way of illustration only and not by way of limitation.

What is claimed as the present invention is:

1. In a reforming system for reforming a naphthenic hydrocarbon feed stock having a boiling point in the range of 150° to 500° F. in which a plurality of separate reaction zones are provided, each of said reaction zones containing a bed of platinum catalyst, the procedure for bringing the system onstream from an initially inactive state which comprises the steps of selecting one of said separate reaction zones as a first selected reaction zone, passing a stream of hot gas consisting essentially of methane at a temperature of about 850° to 1000° F. through said first selected reaction zone until it is at a temperature of about 850° to 1000° F., next charging a mixture of vaporized feed stock and said hot gas to said first selected reaction zone in the ratio of about 1000 to 10,000 cubic feet of said hot gas per barrel of feed under reaction conditions including a temperature within the range of 850° to 1000° F., a space velocity of about 1 to 4 liquid volumes of feed stock per volume of catalyst per hour, and a pressure of about 200 to 400 pounds per square inch, removing the resultant effluent from the said first reaction zone, heating at least a major portion of the gaseous fraction of the effluent and returning it as recycle gas to the said first selected reaction zone and continuing until the hydrogen content of the recycle gas is in excess of 50%, continuing to charge said recycle gas and vaporized feed stock to said first selected reaction zone while withdrawing at least a portion of the gaseous fraction of the effluent from said first selected reaction zone, passing said withdrawn portion of said gaseous fraction through at least a second selected reaction zone of said system to heat it until said second selected reaction zone is heated to a temperature of about 850° to 1000° F., and thereafter charging vaporized feed stock to the said second selected reaction zone under said reaction conditions in the presence of said withdrawn portion of said gaseous fraction to initiate hydroforming of said feed stock in said second selected reaction zone.

2. A method as in claim 1 wherein said first zone is regenerated after at least said second zone has been brought onstream, and wherein said first zone is brought onstream by heating said first zone with hydrogen derived from said second zone and by thereafter charging a mixture of said hydrogen and vaporized feed stock to said first zone under said hydroforming conditions to initiate hydroforming operations in said first zone.

3. A method as in claim 1 wherein said reforming system contains at least three reaction zones and wherein said withdrawn portion of said gaseous fraction of said first reaction zone effluent is simultaneously passed through the remaining reaction zones of said system to simultaneously bring said remaining reaction zones onstream.

4. A method as in claim 1 wherein said reforming system contains at least three reaction zones and wherein said withdrawn portion of said gaseous fraction of said first reaction zone effluent is sequentially passed through the remaining reaction zones of said system to sequentially bring said remaining reaction zones onstream.

References Cited in the file of this patent

UNITED STATES PATENTS

| | | |
|---|---|---|
| 2,232,736 | Schulze | Feb. 24, 1941 |
| 2,303,076 | Frolich | Nov. 24, 1942 |
| 2,472,844 | Munday et al. | June 13, 1949 |
| 2,654,694 | Berger et al. | Oct. 6, 1953 |